Nov. 27, 1934.     R. B. JONES ET AL     1,982,613
SEMITRAILER
Filed July 5, 1933     2 Sheets-Sheet 2
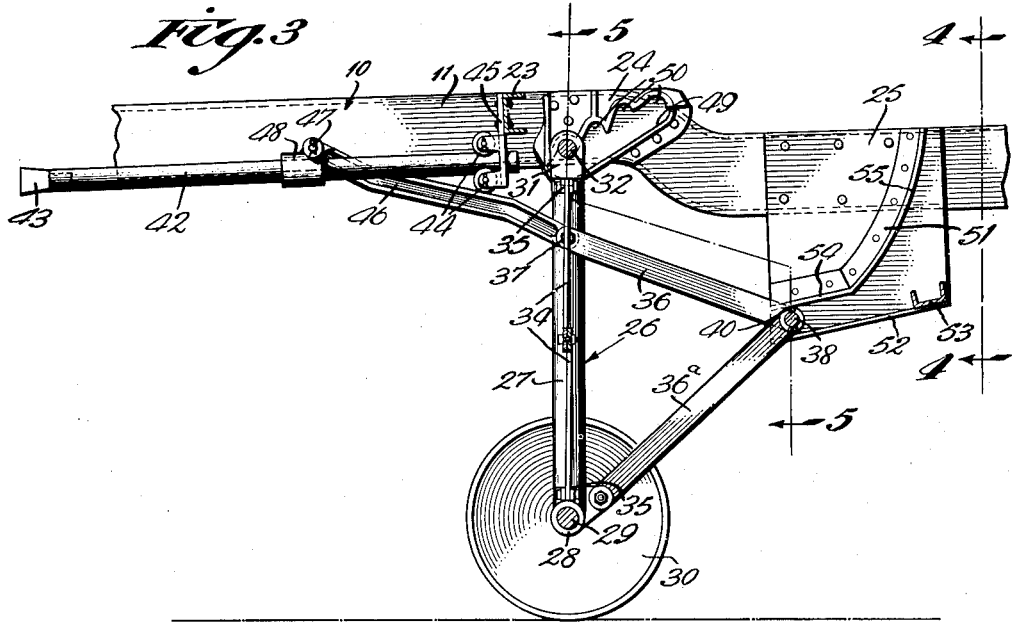

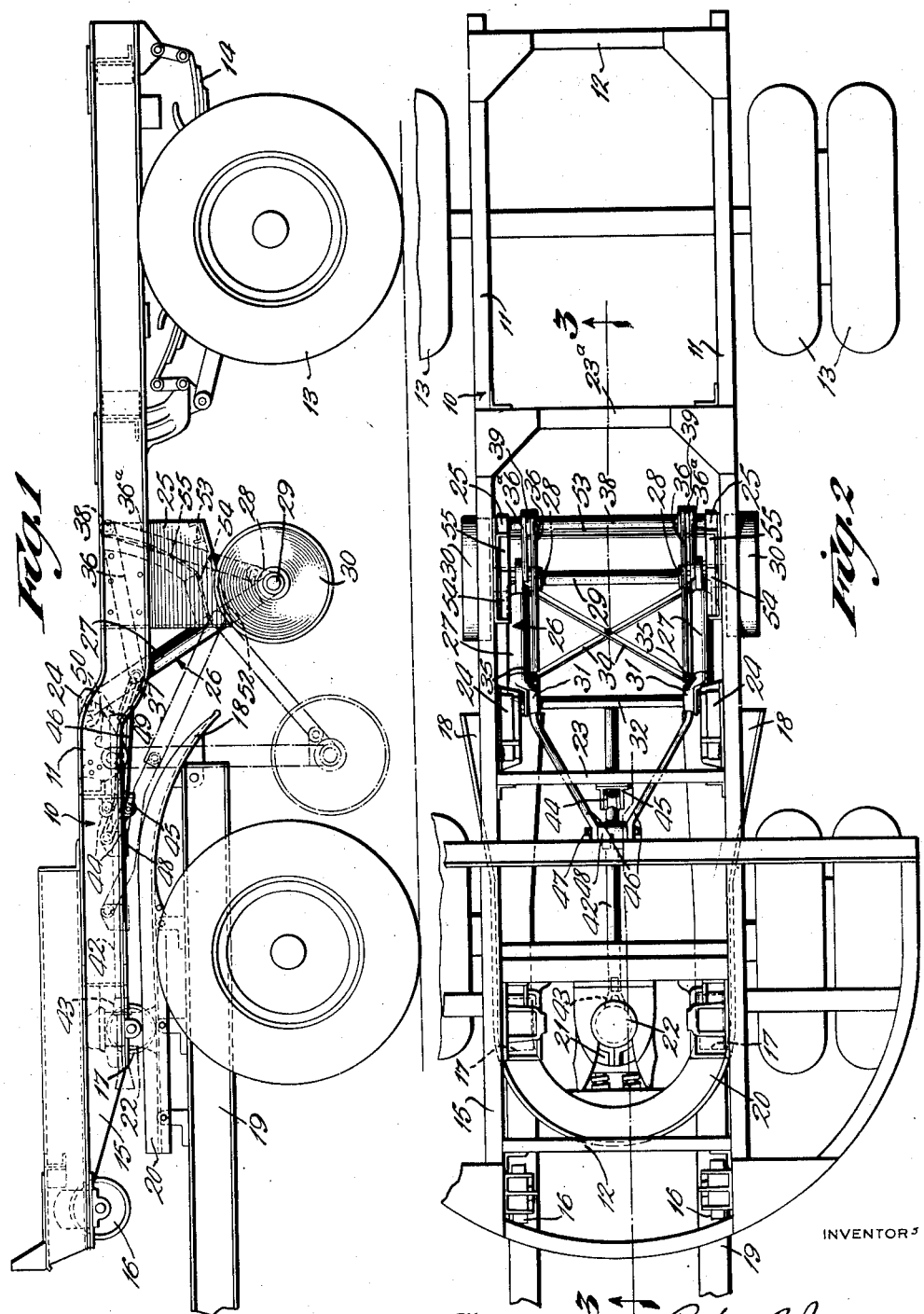

Patented Nov. 27, 1934

1,982,613

UNITED STATES PATENT OFFICE 1,982,613

SEMITRAILER

Rufus B. Jones, Cincinnati, and James J. Black, Newtown, Ohio, assignors to The Trailer Company of America, Cincinnati, Ohio, a corporation of Delaware Application July 5, 1933, Serial No. 679,066

9 Claims. (Cl. 280—33.1)

This invention relates to trailers and is particularly directed to semi-trailers of the type employing a demountable or shiftable prop mechanism for supporting the forward end thereof when uncoupled.

The forward end of this type of trailer includes means at its forward end cooperating with means on the rear end of a tractor for the purpose of a draft and supporting attachment to the tractor. When the trailer is coupled to and supported on the tractor, there is of course no need for the trailer supporting mechanism and it is then desirable to automatically raise the prop mechanism from its normal supporting position to elevated inoperative position so that there will be no interference with the movement of the unit such as might occur due to encounter of the prop with obstructions in the roadway.

The present improvement has occurred in view of the necessity for shortening the length of the trailer to comply with the various State laws and because of the requirement of a short trailer for particular commercial purposes. In solving this problem of compactness and reduction in length, it must be provided that the prop mechanism is mounted relatively close to the forward end of the trailer in order to eliminate any possibility of pitching of the trailer on its forward end when disassociated from the tractor, otherwise known as nose-diving, and at the same time provide increased lateral movement of the prop to get it back far enough to be out of the space required for the supporting tractor.

Accordingly, the object of this invention is to provide an improved prop mechanism at the forward end of a semi-trailer of the type which is adjustable or movable from supporting or operative position to carried or inoperative position, which prop is efficiently disposed the proper distance from the forward end of the trailer in which the prop, its mounting and its operating apparatus are arranged for an increased movement of the prop to an inoperative or carried position entirely clear of the rear wheels of the tractor at any angle of draft connection to the tractor. Thus in a major sense, the improvement involves the provision of a highly efficient prop which, due to its increased movement, can be readily used in short semi-trailers.

It is a further object of this invention to provide an improved prop and support mechanism by means of which the prop is raised a greater distance from the ground than has heretofore been possible without materially increasing the actuating movement of the prop, whereby there is less opportunity for the prop to strike obstructions in the roadway.

It is a further object to provide an improved prop supporting and guiding mechanism and particularly an improved prop operating device actuated during the coupling operation and from mechanism associated with the truck so that the raising and lowering of the prop is fully automatic and there is no possibility of failure in the movements of the prop, particularly to lowered position as when the trailer is uncoupled from the truck.

Other objects and further advantages will be more fully apparent from a description of the accompanying drawings, in which:

Figure 1 is a side view of the trailer and the rear end of the truck, illustrating the trailer in draft and support connection to the truck.

Figure 2 is a fragmentary top plan view of Figure 1.

Figure 3 is a sectional view taken on line 3—3, Figure 2, detailing the mounting and construction of the prop.

Figure 4 is a sectional view taken on line 4—4, Figure 3, further detailing the prop in its relation to the trailer.

Figure 5 is a sectional view taken on line 5—5, Figure 3, illustrating an enlarged detail of one side of the prop.

Since the subject matter of this invention is located entirely at the forward end of the trailer, the details of construction of the trailer frame are confined to the environment of the prop. Only those parts of the trailer and truck combination are shown which are sufficient for an understanding of the general utility of the prop and its relation to the truck and the roadway.

Referring to the drawings, the trailer frame 10 is formed of channel iron side rails 11 and end cross rails 12 and includes rear wheels 13 and a spring mounting 14 therefor. The extreme forward end of the trailer or the nose 15 thereof includes roller mechanisms 16, 17, adapted to engage on and move over the skid portion 18 at the rear end of the truck 19 and to be supported on the fifth wheel 20 thereof. Suitable coupling jaw mechanism 21 is included in the nose of the trailer cooperating with the king pin 22 of the truck. The channel iron side rails 11 of the trailer frame face outwardly and are spaced and reinforced adjacent the prop by means of channel iron cross rails 23, 23ª.

The swinging prop unit 26 which is mounted in guide and support elements 24, 25, two fixed at each side of the frame respectively front and rear, is fabricated of pipe and suitable lug elements with braces joining the pipe. More specifically, there are two main prop standards or legs 27, one at each side of the prop. These standards are formed of pipe lengths and have tubular axle carrying lugs 28 fixed transversely to their lower ends, an axle 29 being mounted between and through the lugs and carrying wheels 30 at its outer ends. The upper ends of the pipe lengths include pivot lugs 31 through which a cross supporting rod 32 is disposed. The ends 33 of the rod are extended beyond the lugs and are operative in the respective guide elements 24 fixed to the inner sides of the side rails 11 of the trailer frame.

This portion of the prop assembly is reinforced by means of an X-brace consisting of flat strips of metal 34 crossed and connected by bolts to small ears 35 extended inwardly from the lugs 31, 28, at the tops and bottoms of the respective standards. Thus the main supporting part of the prop is rigidly braced and is of sufficient strength for supporting the trailer forward end.

A guide mechanism is extended rearwardly from this main prop assembly. Links 36, 36ª, are provided at each side of the prop, one being pivotally connected to the lower lug 28 and the other pivoted on a bolt 37 extended through the particular standard. These links 36, 36ª, are joined at their outer ends on a cross rod 38. A washer 39 on the rod 38 spaces the links, and one link is pinned to the rod, the other being maintained against displacement along the rod by means of a cotter pin 40.

The rear cross rod 38 carries rollers 41 on its extended outer ends. These rollers 41 move in the guide grooves or channels of respective rear brackets 25 fixed to the side rails of the truck frame. It will therefore be apparent that the entire prop assembly depends from or is guided in four supports, two at each side of the trailer frame.

The prop is actuated by means of a rod 42 extended longitudinally and centrally of the frame, this rod having an arcuate element 43 at its forward end adapted for contact with and actuation from the king pin 22 of the truck. The rod 42 is supported between spaced grooved rollers 44, 44, mounted in a bracket 45 fixed to the cross rail 23 of the trailer frame. The peripheral surfaces of these rollers are arcuate in cross section so as to generally fit the circumference of the rod. The rod is connected to the prop by means of links 46 pivotally attached to the pivot bolts 37, 37, and extended inwardly and forwardly and joined on a pivot pin 47 of a pivot bracket 48 mounted on the rod.

The forward guides or prop supports 24 include inwardly facing inclined grooves 49 in which the cross rod 32 is disposed for movement and a series of vertically disposed rod receiving notches 50 in the upper sides of the grooves. The guide brackets or rearwardly disposed brackets 25 include angular guide rails 51. The brackets are formed of plate steel and the guide rails of angle iron. The forward and lower edges of the plates include flanges 52. A connecting rail 53 connects the plates being attached between the lower flanges thereof. The guide rails 51 against which the guide rollers 41 operate have slightly inclined portions 54 and curved abruptly inclined portions 55, the functions of which will be made apparent hereinafter.

In considering the movement of the prop, attention is directed to Figures 1 and 3 which show the extreme upper and the extreme lower position of the prop respectively. In the lower position (see Figure 3) when the trailer is entirely disassociated from the truck the full weight of the forward end of the trailer is on the prop, the cross rod 32 thereof being engaged in respective notches 50 of the forward guide brackets. The selection of the particular notch of the series by the prop is entirely dependent on the relation of the surface of the roadway to the trailer when the trailer is uncoupled from the truck. If the prop wheels make contact with the ground prior to full lowering thereof in the grooves 49, the prop rollers will engage certain of the upper notches 50. If the level of the roadway is perfectly smooth, that is to say, the same elevation at the prop as at the rear wheels of the truck and trailer, then the prop will engage in the lowest notch since it will have moved to carry the cross shaft to the lower ends of the grooves 49.

When the prop is in supporting position, the rearwardly extended guiding assembly will function to stabilize the prop and maintain it in vertical position due to the fact that the tendency of the prop would be to rotate on its supporting rod 32, the radius of rotation or attempted arc of travel of the cross rod 38 of the stabilizing arms being angularly and against rail 51 at its lower end portion. Movement of the prop is impossible for this reason. Moreover, the rollers on the cross rod engage against the flanges 52 of the brackets.

When the trailer is being acted on by the truck, the first action is to raise the forward end of the trailer, the prop then dropping into the main part of the grooves 49, 49, of the supporting brackets 24 and being conditioned for travel in these channels, the prop depending from the brackets 24 at this time. As the coupling operation progresses, the forward end of the translatable rod 42 engages the king pin 22 of the tractor and is moved rearwardly. This motion is transmitted to the prop and the prop is moved rearwardly, both the main prop supporting rod 32 and the rear guide rod 38 travelling upwardly, the former in the grooves 49, 49, of the brackets 24 and the latter against the rails 51 at the slightly angular portions thereof.

When the cross rod 32 supporting the main prop portion abut the upper ends of the grooves 49, 49, of the brackets 24, further translation of the rod 42 causes a swinging movement of the prop, the guide or rear rod 38 then swinging on an arc of rotation defined by the axis of the main support rod, and moving up the abruptly inclined portions of the rear or guide brackets. This latter swinging movement results in a rapid elevation of the prop and proper clearance between the prop and the rear wheels of the truck is accomplished quickly. The amount of movement of the rod 42 necessary to accomplish this raising movement of the prop and the space consumed for mounting the prop is much less than if long straight inclined grooves and rails of the same length were used.

The movement of the prop may be described as both lineal and rotative, the lineal movement taking place at an angle upwardly in the first phase of movement and the rotative movement occurring in the last phase of movement.

Having described our invention, we claim:

1. An articulated vehicle including the combination of a tractor having a fifth wheel and a king pin, and a trailer having a forward coupling portion adapted to be supported on the fifth wheel of the tractor; a prop mounted at the forward portion of the trailer and adapted to support the same when dissassociated from the tractor, supporting brackets for said prop, said brackets including guideways engaged by the prop and related for causing upward lineal movement and one of said brackets including a stop for causing rotative upward movement of the prop when the prop is moved in said guideways, and means operated by the tractor for moving the prop relative to said guideways.

2. A semi-trailer including wheels at its rear end and its forward end adapted for support and coupling attachment to a tractor, a prop mounted under the forward end of said trailer, said prop including a main supporting portion and a rearwardly extending stabilizing and guide portion, respective brackets for supporting said main portion and stabilizing portion, said brackets and said prop portions including complementary elements for a sliding connection of the prop to the brackets, said brackets disposed for causing upward movement of the prop when the prop is moved rearwardly and co-related to provide a final upward swinging action to the prop, whereby it is raised fully from any possible contact with the rear wheels of the tractor, and means for moving said prop rearwardly.

3. In a tractor trailer combination including the fifth wheel and king pin of the tractor and a prop mechanism for the forward end of the trailer; comprising, a rigid prop framework, a front and a rear supporting bracket fixed to each side of the trailer frame including guide elements, elements carried by said prop framework engaging said guide elements whereby a double support for the prop at each side of the trailer is provided, the guide elements of said brackets inclined slightly, one of said guide elements at each side of the trailer including an upper stop, the other of the guide elements at each side of the trailer including an extended portion of more abrupt angle, means for moving the prop upwardly against said guide elements, whereby an initial elevating movement is imparted to the prop, and a final swinging action is imparted when the stop is encountered to raise the prop more abruptly when the abrupt angle portion is traversed.

4. In a tractor trailer combination including the fifth wheel and king pin of the tractor; a prop structure mounted at the forward end of the trailer, comprising, a vertically disposed and wheeled prop frame, a cross rod connecting said prop to the frame, brackets fixed to the frame and including inclined grooves closed at their upper ends and cooperating with said cross rod, a rearwardly extended guiding and stabilizing structure carrying a rear cross rod, inclined rear guide rails fixed to the trailer frame cooperating with said rear cross rod, the angle of said rear guide rails being more abrupt toward the upper ends thereof, whereby swinging movement of the prop occurs by rotation thereof on the forward rod when the upper ends of the forward grooves are reached and the rear cross rod moves up the inclined rails, and means actuated from the king pin of the truck for moving the prop upwardly in said grooves to inoperative position.

5. In a tractor and trailer combination, comprising, a tractor having a coupling pin and fifth wheel and a semi-trailer including wheels at its rear end and its forward end adapted for support and coupling attachment to a coupling pin of the tractor; a prop mounted under the forward end of said trailer, said prop including a main supporting portion and a rearwardly extending stabilizing and guide portion, respective brackets for supporting said main portion and stabilizing portion, said brackets and said prop portions including complementary elements for a sliding connection of the prop to the brackets, said brackets including grooves and rails disposed for causing upward movement of the prop when the prop is moved rearwardly and co-related to provide a final swinging action to the prop, whereby it is raised fully from any possible contact with the rear wheels of the truck, and means on the semi-trailer operated by the tractor for moving said prop rearwardly.

6. In a tractor trailer combination including the fifth wheel and king pin of the tractor; a vertically disposed and wheeled prop frame on the forward end of the trailer, a cross rod connecting said prop to the frame, guiding and supporting brackets fixed to the frame and cooperating with said cross rod, a rearwardly extended guide structure carrying a cross rod, and guide brackets fixed to the trailer frame including guides angularly disposed and engaged by said cross rod, the angle of said guides being more abrupt toward the upper ends thereof, whereby swinging movement of the prop is accomplished by rotation thereof from the forward rod and the upper parts of the grooves are reached, and means actuated from the king pin of the truck for moving the prop.

7. In a tractor trailer combination including the fifth wheel and king pin of the tractor; a prop mechanism for the forward end of the trailer, comprising, a rigid prop framework including front and rear support elements, front and rear supporting brackets fixed to the respective sides of the trailer frame and having inclined guideways engaged by the respective elements of the framework providing a double support and guide for the prop at each side of the trailer, one of the guideways at each side of the trailer including a closed upper end and the other of the guideways including a portion of more abrupt angle for movement of the prop support after the closed ends of the first are reached, means for moving the prop upwardly in said guideways, whereby an initial elevating movement is imparted to the prop as it moves up the guideways, and a final swinging action is imparted to raise it more abruptly when the closed ends and abrupt angle portions are encountered.

8. In a tractor trailer combination in which the forward portion of the trailer is adapted to be supported on the rear portion of the tractor; a prop mechanism for the trailer, mounting and guiding means for said prop disposed on the trailer toward the forward end thereof, said prop mounted for successive slidable and pivotal movement in said supporting means, and means extended to the forward end of the trailer for engagement by the tractor for moving the prop rearwardly and concurrently swinging the same upwardly.

9. In a tractor trailer combination in which the trailer forward portion is adapted to be supported on the tractor rear portion, a supporting prop for said trailer, forward and rear guide brackets for mounting and guiding said prop, said guide brackets related for initial rearward upward movement and final swinging movement of the prop rearwardly as the prop is forced rearwardly, a rod longitudinally mounted in the trailer and adapted to be engaged by the tractor, and a flexible linkage connection between the rod and the prop.

RUFUS B. JONES.
JAMES J. BLACK.